United States Patent [19]

Goodwin et al.

[11] Patent Number: 5,370,197

[45] Date of Patent: Dec. 6, 1994

[54] AIR CUSHION VEHICLE

[75] Inventors: William Goodwin, Mt. Clemens; Matthew Goodwin, Sterling Heights; Rodney Caswell, New Baltimore, all of Mich.

[73] Assignee: Goodwin Hovercraft Company, Inc., Mt. Clemens, Mich.

[21] Appl. No.: 942,945

[22] Filed: Sep. 9, 1992

[51] Int. Cl.⁵ .................... B60V 1/14; B60V 1/18
[52] U.S. Cl. ......................... 180/117; 180/127
[58] Field of Search .......... 180/117, 120, 127, 121, 180/128, 122, 116

[56] References Cited

U.S. PATENT DOCUMENTS

| | | | |
|---|---|---|---|
| D. 219,077 | 10/1970 | Voyce | D12/5 |
| D. 245,492 | 8/1977 | Clare | D12/5 |
| D. 287,234 | 12/1986 | Chia | D12/5 |
| D. 323,473 | 1/1992 | Chia et al. | D12/5 |
| 3,270,827 | 9/1966 | Mantle | 180/116 |
| 3,362,495 | 1/1968 | Lacey | 180/117 |
| 3,379,271 | 4/1968 | Hopkins et al. | 180/128 |
| 3,397,753 | 8/1968 | Hunt et al. | 180/127 |
| 3,540,542 | 11/1970 | Hopkins | 180/127 |
| 3,561,558 | 2/1971 | Parkhouse | 180/120 |
| 3,599,746 | 8/1971 | Davis et al. | 180/127 |
| 3,685,607 | 8/1972 | Eglen | 180/116 |
| 3,709,318 | 1/1973 | Ferguson | 180/116 |
| 3,756,343 | 9/1973 | Jocye, Jr. | 180/127 |
| 3,776,360 | 12/1973 | Anders et al. | 180/127 |
| 3,800,905 | 4/1974 | Wright et al. | 180/117 |
| 3,891,047 | 6/1975 | Rapson | 180/117 |
| 3,918,548 | 11/1975 | Dyke | 180/117 |
| 3,921,753 | 11/1975 | Pont | 180/127 |
| 3,951,227 | 4/1976 | Lafont | 180/121 |
| 3,968,851 | 7/1976 | Windt | 180/117 |
| 4,122,909 | 10/1978 | Fair et al. | 180/127 |
| 4,249,628 | 2/1981 | Longley | 180/117 |
| 4,258,817 | 3/1981 | Hunt | 180/127 |
| 4,702,332 | 10/1987 | Prentice | 180/127 |
| 4,747,459 | 5/1988 | Penha | 180/121 |
| 4,821,829 | 4/1989 | Gilbert et al. | 180/127 |
| 4,848,501 | 7/1989 | Goodwin et al. | 180/117 |
| 5,042,605 | 8/1991 | Moriwake | 180/117 |
| 5,096,012 | 3/1992 | Chia et al. | 180/117 |
| 5,097,919 | 3/1992 | Cox | 180/117 |

FOREIGN PATENT DOCUMENTS

| | | | |
|---|---|---|---|
| 2271967 | 1/1976 | France | 180/120 |
| 2347244 | 12/1977 | France | 180/117 |

OTHER PUBLICATIONS

"Hoverstar-Four Seasons of Fun" brochure, Hovertechnics, Inc., New Buffalo, Michigan.

Lémere Hovercraft brochure, Neoteric USA, Inc., Terre Haute, Indiana.

Hake Hovering Systems Huskly MK-O brochure, Eddystone, Pennsylvania.

Primary Examiner—Brian L. Johnson
Assistant Examiner—Kevin Hurley
Attorney, Agent, or Firm—Basile and Hanlon

[57] ABSTRACT

A small-sized air cushion vehicle includes a hull having a planar bottom surface with an upstanding lower flange disposed at a predetermined angle with respect to the bottom surface. A plurality of apertures are formed in the peripheral flange. An upper hull is mounted on the lower hull and includes a centrally located occupant area. The upper hull engages the lower hull to form a hollow plenum chamber extending internally around the periphery of the upper and lower hulls. A plurality of inflatable members are mounted on the exterior surface of the peripheral flange and are each disposed in fluid flow communication with an aperture in the peripheral flange. A motor driven fan is mounted on the upper hull and directs a portion of an air stream rearward of the vehicle to propel the vehicle and another portion of the air stream into the plenum chamber to inflate the inflatable members and to lift the vehicle a short distance above an underlying surface. A steering mechanism includes a control lever mounted in the occupant area which is connected by a linkage to rudders pivotally mounted on the hull rearward of the fan to control the position of the rudders and the directional movement of the air cushion vehicle. A pivotal canopy with a removable roof covers the occupant area.

6 Claims, 7 Drawing Sheets

AIR CUSHION VEHICLE

BACKGROUND OF THE INVENTION

1. Field of the Invention

The present invention relates, in general, to air cushion or ground effect vehicles and, more particularly, to small-sized air cushion vehicles.

2. Description of the Art

Fluid cushion vehicles which are suspended a slight distance above an underlying ground or water surface by pressurized fluid flow beneath such vehicles are well known. Typically, an inflatable skirt formed of a flexible material, such as rubber, plastic, etc., is mounted about the periphery of the vehicle and directs fluid flow from a motive source, such as a fan mounted on the vehicle, through the inflatable skirt against the underlying ground or water surface to both raise the vehicle a short distance, such as nine to twelve inches, above the underlying surface as well as to provide thrust rearward of the vehicle for forward or sideways movement as controlled by a steering mechanism.

U.S. Pat. No. 4,848,501 to the present Applicants discloses a small-sized air cushion vehicle which has all of the features of larger air cushion vehicles; but is designed in a smaller overall size for carrying two passengers. While Applicants' prior air cushion vehicle, as disclosed in U.S. Pat. No. 4,848,501, is easy to steer and usable on both land and water, it has been found that it is possible to improve the steering and propulsion system of such an air cushion vehicle, as well as to simplify its manufacture.

SUMMARY OF THE INVENTION

The present invention is a small-sized air cushion vehicle for air travel above ground and/or water.

The vehicle includes a hull structure formed of a lower hull having a planar bottom surface with an upstanding peripheral flange disposed at a predetermined angle with respect to the bottom surface. A plurality of spaced apertures are formed in the peripheral flange. An upper hull is secured to the lower hull and includes an inward curving exterior surface which terminates in a centrally located recess extending downward from the exterior surface into engagement with the bottom surface of the lower hull. Flotation material is disposed between the upper and lower hulls around the side walls of the recess. A plenum chamber is formed between the upper and lower hulls about the periphery of the recess and the surrounding flotation material in communication with the apertures in the peripheral flange of the lower hull. A splitter plate is formed in the upper hull and forms an aperture in the rear portion of the upper hull which opens to the plenum chamber. An upper deck is attached to the upper hull and pivotally supports a canopy which closes the central recess in the upper hull.

Fluid propulsion means in the form of a motor driven fan is mounted on the upper hull in front of the splitter plate and the aperture in the upper hull and directs air rearward of the upper hull, a portion of which is directed by the splitter plate through the aperture and into the plenum chamber. A plurality of inflatable members, such as flexible bags, each having first and second apertures formed therein, are attached to the peripheral flange of the lower hull and inflate when air is directed through the plenum chamber and out of the apertures in the lower hull. Air passing through the inflatable members is forced against an underlying surface to lift the air cushion vehicle a small distance, such as nine to twelve inches, above the underlying ground or water surface.

A steering means is provided for controlling the direction of movement of the air cushion vehicle. A control lever is mounted in the occupant area and connected to a linkage formed of multiple, pivotally connected links and rods, the outlet one of which is connected by cables to a plurality of planar plates or rudders mounted on the upper hull, rearward of the fan. A portion of the air stream generated by the fan passes through the plates. Pivotal movement of the plates to the left or right via the control lever and linkage provides left and right directional control of the vehicle during forward movement thereof. According to the present invention, the linkage is designed to enable full or partial left and right turns of the vehicle to be implemented at the same time the vehicle is in the full forward propulsion position to provide greater control and maneuverability of the vehicle.

According to another aspect of the present invention, a drive shaft is connected via a flexible coupler to the power takeoff of a motor. The power takeoff drives a rotatable shaft which is mounted in a plurality of spaced bearings affixed to a support plate mounted on the upper hull. A pulley is attached to the rotary shaft and is coupled via a belt to another pulley mounted on a second, vertically spaced shaft which drives the fan. This places the fan above the motor and lowers the center of gravity of the air cushion vehicle.

Pitch control is provided by a pivotal elevator trim wing which is mounted in front of the planar plates or rudders and is connected by a cable to a lever mounted in the occupant area or cockpit. The elevator trim wing has an air foil shape and is pivotal from a substantially horizontal position for level forward flight to an angularly inclined position which lowers the nose or bow of the vehicle during takeoff.

According to another aspect of the present invention, roll control means are provided to aid in turning the vehicle in a left or right direction. A plate is mounted in the plenum chamber at the bow of the vehicle and completely closes the plenum chamber at the front central location. A pair of pivotally mounted diverter gates are mounted in the plenum chamber at the stern or rear end of the vehicle on opposite sides of the longitudinal center line of the vehicle. Cables connect each diverter gate to the control linkage. The diverter gates are simultaneously movable in opposition to each other from a generally perpendicular position to the direction of air flow through the plenum to block a major portion of the air flow through one side of the plenum to an angular position allowing greater air flow to one side of the plenum chamber. In this way, air flow through the plenum chamber is selectively controlled during a left or right turn to increase the air flow on one side of the vehicle and to decrease the air flow on the other side of the vehicle so as to create greater or less lift on each side of the vehicle during a left or right turn.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
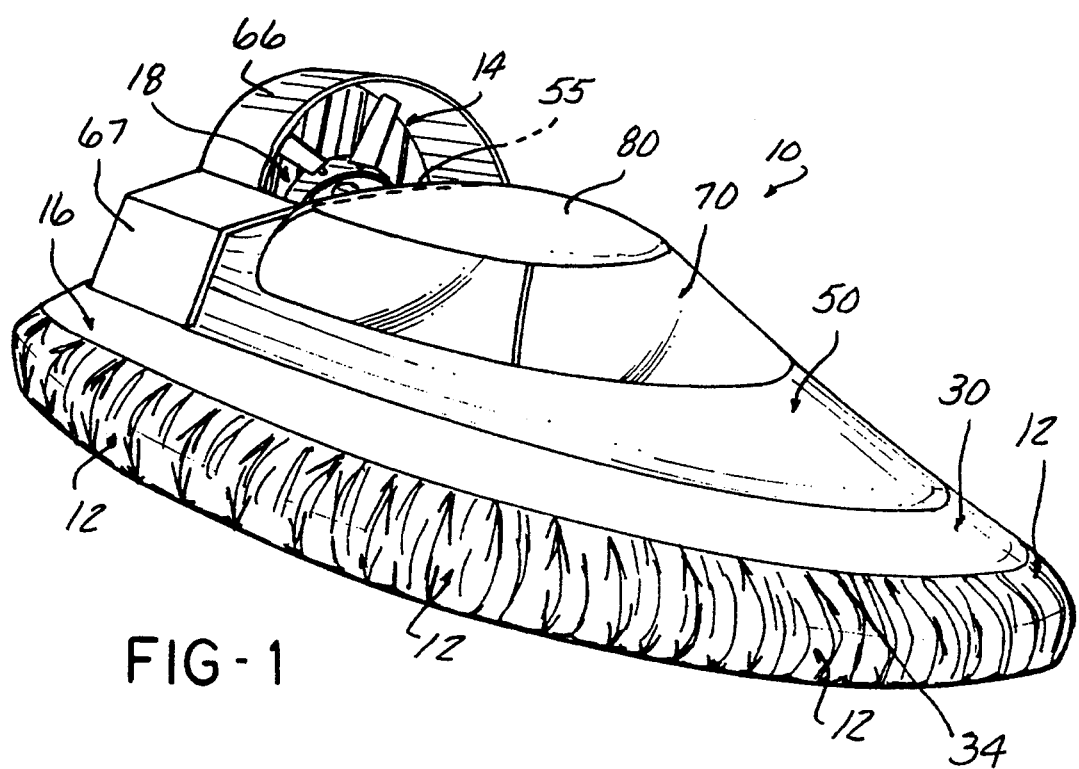
FIG. 1 is a perspective view of an air cushion vehicle according to the present invention.

Referring now to the drawing, and to FIG. 1 in particular, there is disclosed a small-sized, individually operated air cushion vehicle 10 which utilizes air flow directed through inflatable members 12 mounted on the a peripheral edge portion of the bottom of the vehicle 10 against an underlying ground or water surface to lift the vehicle 10 a short distance, such as nine to twelve inches, above such surface. Forward, rearward and/or sideways propulsion is provided by a motive powered, fluid propulsion source 14 mounted adjacent a rear portion of a hull, shown generally by reference number 16 and a steering mechanism denoted generally by reference number 18.

Figure 2:
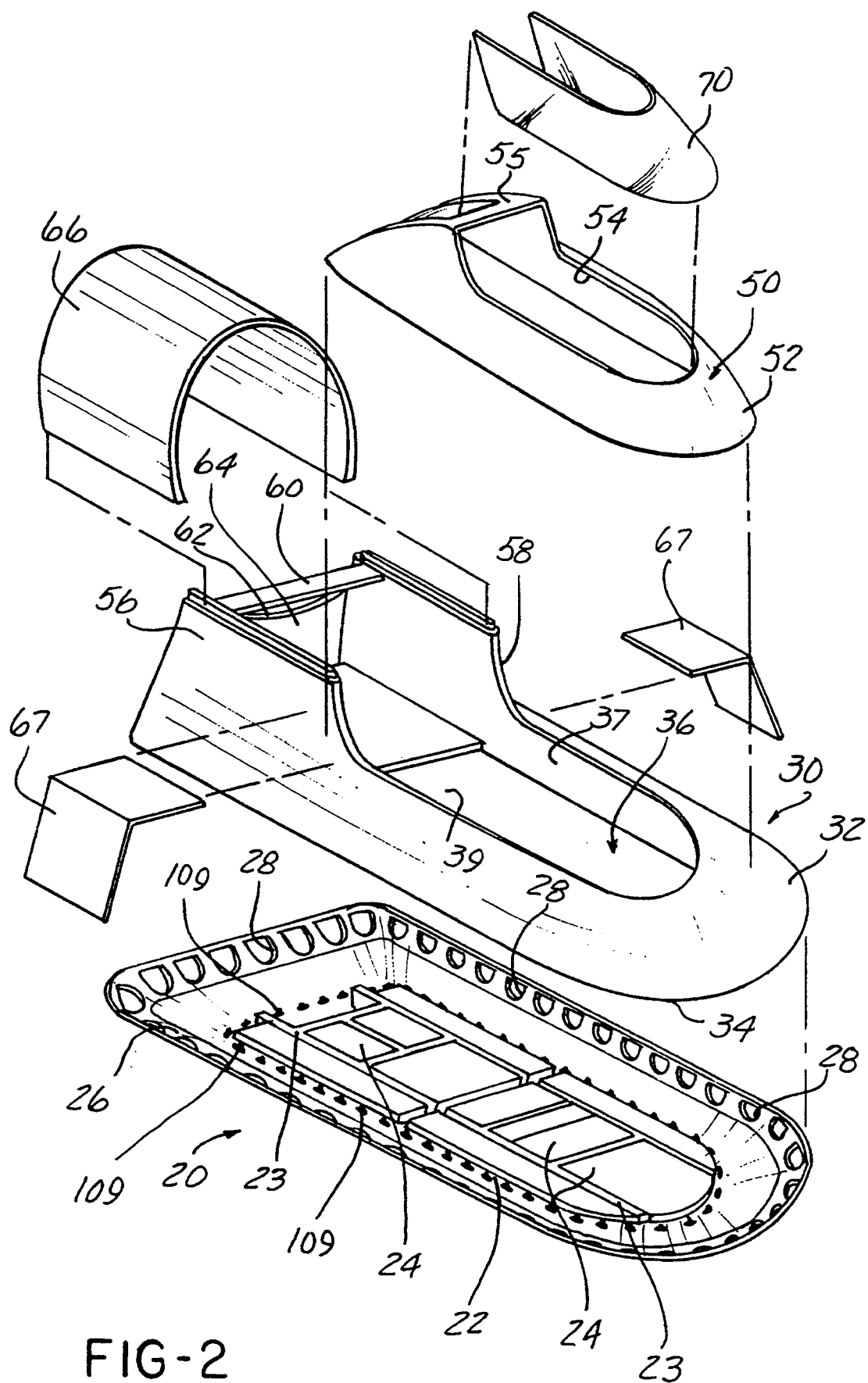
FIG. 2 is an exploded view showing the hull structure, deck, shroud, canopy and air intake portions of the air cushion vehicle.

As shown in FIG. 1, and in greater detail in FIG. 2, the hull 16, which is formed of fiberglass or a molded plastic, includes a lower hull 20 having a substantially planar or flat base portion 22 on which a support frame 23 and buoyant material pads 24 are mounted. A peripheral flange denoted generally by reference number 26 is integrally formed with the base 22 and extends outward and generally upward from the base 22 at a predetermined angle. Preferably, the peripheral flange 26 extends upward at an angle of between 24° to 30° with respect to the planar bottom surface or base 22 of the lower hull 20. A plurality of spaced apertures 28 are formed in the flange 26 completely around the periphery of the lower hull 20. The purposes of the apertures 28 will be described in greater detail hereafter.

Figure 4:
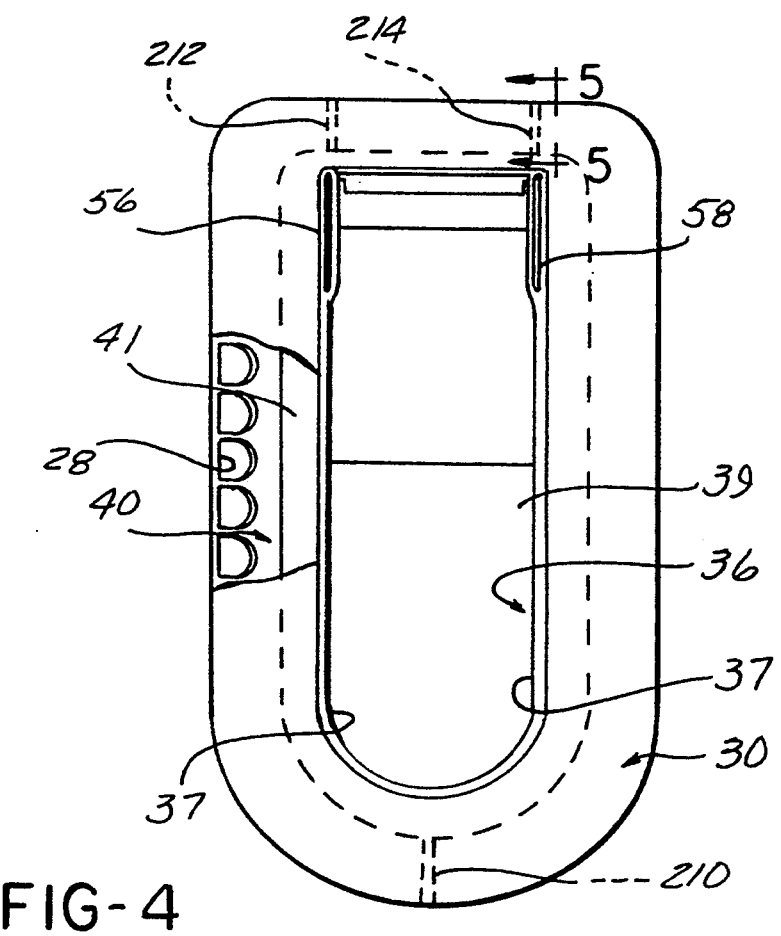
FIG. 4 is a plan view of the air cushion vehicle shown in FIG. 1, particularly showing the plenum chamber therein.

An upper hull 30 is secured by means of adhesive and/or rivets to the lower hull 20. The upper hull 30 has a generally curved exterior surface 32 which extends from a peripheral edge 34 inward to a generally centrally located recess 36. The recess 36 is formed by depending side walls 37 and a base 39 which extend below the exterior surface 32 of the upper hull 30 and rests on the frame 23 and the buoyant pads 24 mounted on the planar bottom surface or base 22 of the lower hull 20. The vertically extending side walls 37 are spaced from the peripheral edge 34 of the upper hull 30 and, in conjunction with the peripheral flange 26 of the lower hull 20, form a continuous plenum chamber denoted by reference number 40 in FIG. 4 which extends completely around the periphery of the air cushion vehicle 10, between the lower hull 20 and the upper hull 30. Buoyant flotation material 41, such as poured foam, is formed around the side walls 37 of the recess 36.

The plenum chamber 40 is disposed in fluid flow communication with the apertures 28 formed in the peripheral flange 26 of the lower hull 20. A T-deck 50 is mounted on and secured to the upper hull 30 by rivets and/or adhesive. The T-deck 50 has a smoothly curved exterior surface 52 which forms a continuous, smoothly curved surface with the surrounding surface 32 of the upper hull 30. A central opening 54 is formed in the T-deck 50 between the surface 52 and a rear shelf 55. The opening 54 is coincident with the recess 36 in the upper hull 30 which forms an occupant seating area or cockpit, hereafter also denoted by reference number 36.

A rear portion of the recess 36 in the upper hull 30 also receives the motive power source, as described hereafter, which is mounted on the base 39. A pair of upstanding, spaced side walls or pillars 56 and 58 are formed on a rear portion of the upper hull 30. A planar, generally horizontal, splitter plate 60 extends between the side walls 56 and 58 and is spaced above an aperture 62 which is formed in a rear wall 63, FIG. 9, of the upper hull 30. The aperture 62 is disposed in fluid flow communication with the plenum chamber 40 for air flow therethrough. A generally semicircular shroud 66 is mounted on and secured by means of adhesive and/or rivets to the upper ends of the spaced side walls 56 and 58. The shroud 66 surrounds the fan blades and steering plates or rudders, as described hereafter. Air intakes 67 are attached to opposite sides of the shroud 66, deck 50 and upper hull 30. The air intakes 67, which have a generally L-shape, direct air toward the fan and provide lift to the rear end of the vehicle 10 during forward movement thereof.

Figure 3:
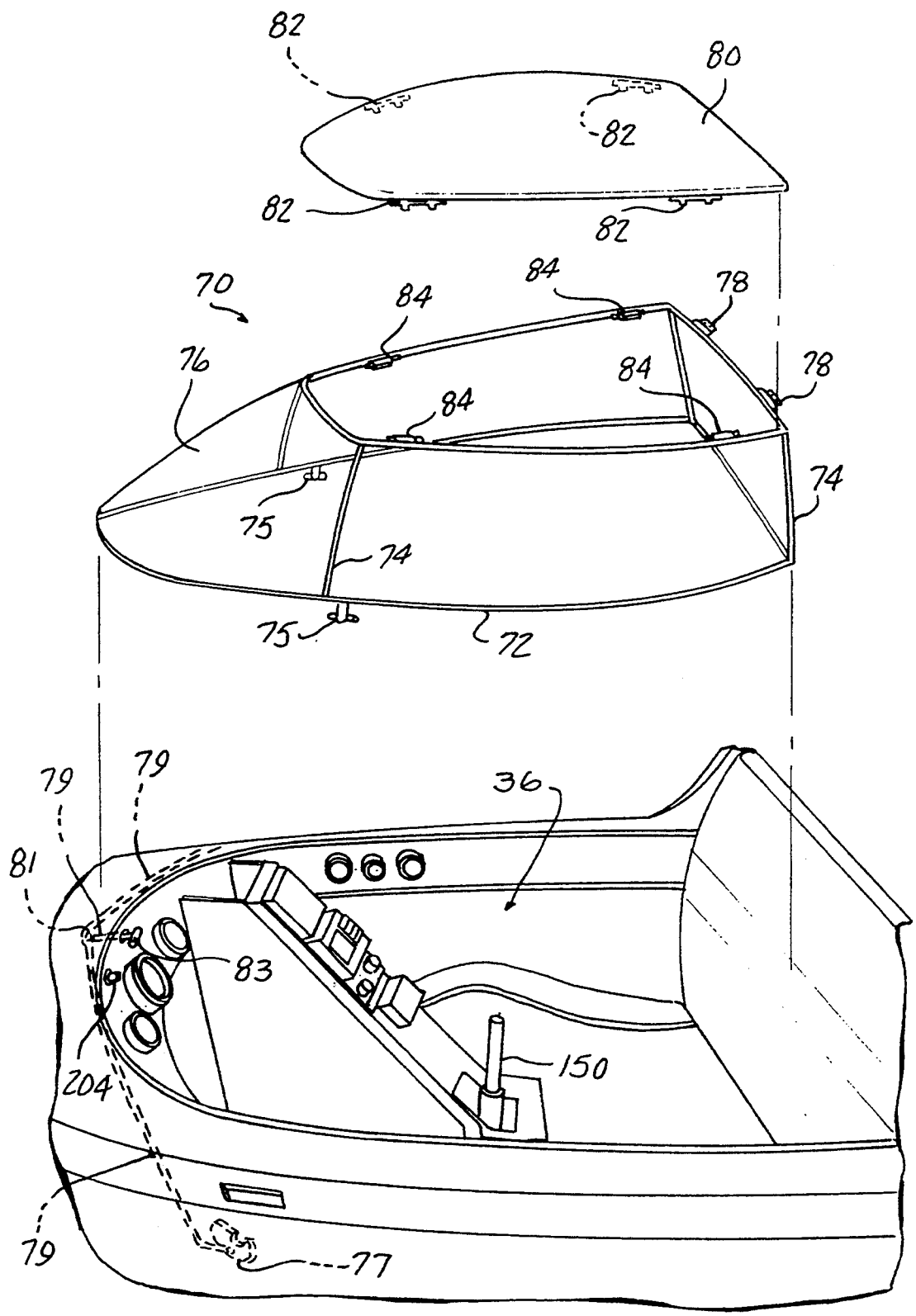
FIG. 3 is an exploded, perspective view showing the occupant area and canopy of the air cushion vehicle.

As shown in FIG. 1, 2 and 3, a canopy 70 is pivotally mounted to the T-deck 50 and is disposed over the occupant area or cockpit 36. The canopy 70 includes a tubular frame 72 formed of upper and lower tubular segments which are interconnected by vertically extending segments 74. A glass or plastic windshield 76 is mounted on the frame segments 72 and 74 and surrounds the sides and front portions of the canopy 70. A hinge means 78, such as any suitable hinge, i.e., leaf hinge, piano hinge, etc., is mounted on a rear portion of the tubular frame 72 of the canopy 70 and is attachable to the upper shelf 55 of the T-deck 50 to pivotally mount the canopy 70 to the T-deck 50 and to allow the canopy 70 to be moved from a first position shown in FIG. 1 in which the canopy 70 completely closes the interior occupant area 36 to a raised position allowing ingress and egress to and from the occupant area 36.

According to a unique feature of the present invention, a roof member 80 is releasably connected to the canopy frame segments 72. The roof member 80 has releasable latch elements 82 mounted thereon which interconnect with corresponding latch elements 84 attached to the canopy frame segments 72. The latch elements 82 and 84 may form a conventional two-part, releasable latch, such as those typically found in automobile sunroofs. The latch elements 82 and 84 enable the roof member 80 to be removed from the canopy 70, if desired.

The canopy 70 is releasably latched in the closed position to the T-deck 50 by a latch assembly including a pair of strikers 75 mounted on the frame segments 72. The strikers 75 releasably engage a spring-biased latch plate 77, similar to automobile door lock plates, which is mounted in the T-deck 50. Release cables 79 extend from a release trigger connected to the latch plates 77 to an exterior mounted latch release bar 81 mounted on the T-deck 50 and an interior bar 83 mounted in the occupant area 36.

Figure 5:
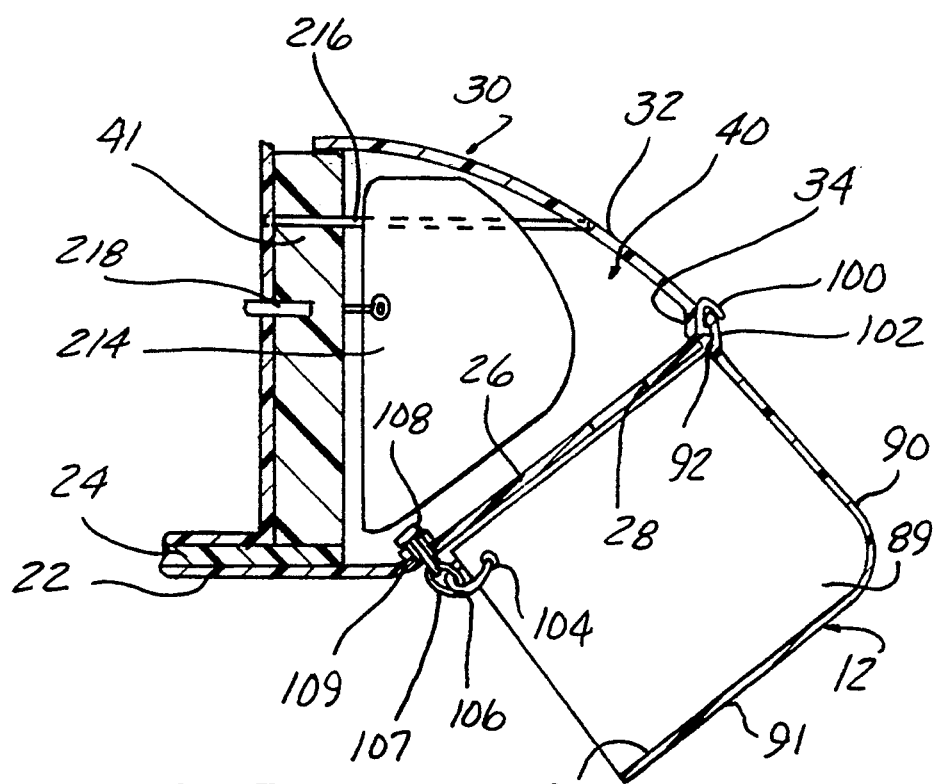
FIG. 5 is a cross sectional view generally taken along line 5—5 in FIG. 4.

As shown in FIGS. 1 and 5, the inflatable members 12 comprise a plurality of individual members, each of which are attached to the hull by means of suitable fasteners, as described hereafter. The inflatable members 12 may be formed of any suitable material, such as rubber, plastic, etc., and have a hollow, generally bag-like shape when fully inflated, as shown in FIG. 5. Each inflatable member 12 is provided with opposed side walls 89, one of which is shown in FIG. 5, an end wall 90 and a bottom wall 91. The side walls 89 and the end wall 90 form an open end 92 therebetween which is disposed adjacent to one of the apertures 28 in the flange 26 of the hull 20 to provide fluid communication between the plenum chamber 40 and the interior of the inflatable member 12. The side walls 89 and the bottom wall 91 form another open end 94 which opens below the planar bottom surface 22 of the lower hull 20 to direct air flow underneath the vehicle 10 to provide lift and to raise the vehicle 10 a small distance above the underlying ground or water surface.

A deflector plate, not shown, may be mounted in the inflatable members 12 located at the front and the side portions of the vehicle 10 to deflect air from the aperture 92 to the aperture 94 so as to create a high air flow across the plate to maintain the inflation of the member 12. A further description of the mounting and use of such a deflector plate can be obtained from U.S. Pat. No. 4,848,501, the content of which is incorporated herein by reference.

Each inflatable member 12 is connected to the flange 26 of the lower hull 20 by means of suitable fasteners. The outer portion of each inflatable member 12 is releasably secured to the peripheral edge 34 of the upper hull 30 by means of a J-clip 100 which is attached by means of rivets, stitching and/or adhesive to the peripheral edge 34 of the upper hull 30. The J-clip 100 includes a pair of spaced side walls which resiliently surround an interior cavity. A prong 102 is attached by means of stitching to each inflatable member 12 and is releasably engageable in a snap fit into the J-clip 100 to attach the outer portion of each inflatable member 12 to the hull structure of the air cushion vehicle 10.

Each of the side walls 89 of each inflatable member 12 has a grommet 104 mounted therein which receives a locking fastener 106, such as a tie-wrap, therethrough. The fastener 106 engages a metal loop 107 which is connected by a rivet 108 to a hollow anchor 109 mounted on and extending through the bottom surface 22 of the lower hull 20.

Figure 6:
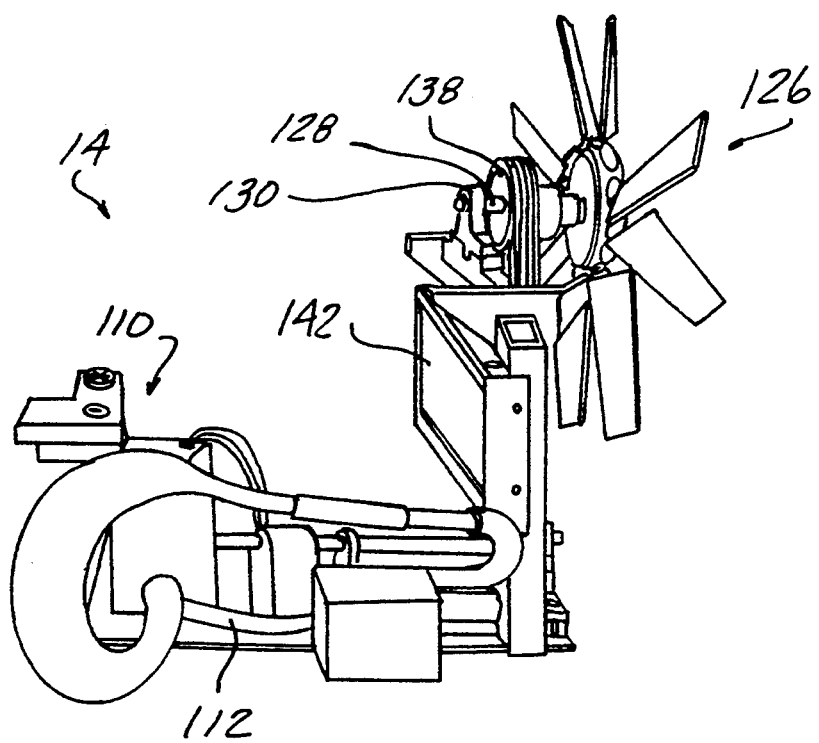
FIG. 6 is a perspective view of the propulsion system including a motor and fan.
Figure 7:
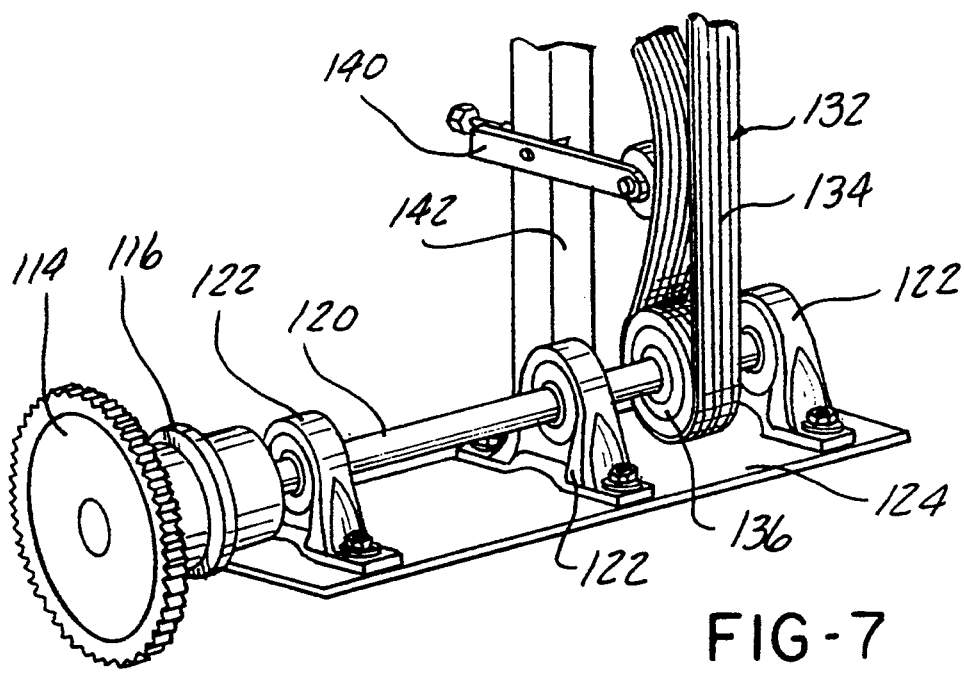
FIG. 7 is an enlarged, perspective view showing the power takeoff, rotary shaft and belt connections of the propulsion system shown in FIG. 6.

The propulsion means 14 for the air cushion vehicle 10 is shown in greater detail in FIGS. 6 and 7. As shown therein, a motive power source 110, such as an internal combustion engine, is mounted on a base 112 which is attached to the base 39 in the upper hull 30. The motor 110 is provided with a flywheel 114 which drives a power takeoff or rotary shaft 120. A flexible coupling 116 is connected between the flywheel 114 and the elongated rotatable shaft 120 for coupling rotation of the motor 110 to rotation of the rotary shaft 120. The shaft 120 is rotatably supported by a plurality of bearings 122, preferably three bearings 122, which are spaced along and mounted to a support plate 124. The bearings 122 distribute the load forces exerted on the rotary shaft 120. A multi-bladed fan 126 is connected to a second rotatable shaft 128 which is supported by means of a pair of spaced bearings 130 mounted on a support plate. The second rotatable shaft 128 is spaced vertically above the first rotary shaft 120 such that the motor 110 is mounted low in the air cushion vehicle 10 to provide a low center of gravity for the vehicle 10.

Means are provided for coupling the first and second rotary shafts 120 and 128. In a preferred embodiment, as shown in FIG. 7, the coupling means 132 comprises a belt 134 which is mounted between a first pulley 136 fixedly mounted on and rotatable with the first rotary shaft 120 and a second pulley 138 (FIG. 6) fixedly mounted on and rotatable with the second rotary shaft 128. A belt tensioning means, such as an adjustable roller assembly 140, is mounted to a support member 142 attached to the plate 124 to maintain tension on the belt 134.

Other components, such as a radiator 142, gas tank, etc., typically employed with an internal combustion engine 10 are also provided in the vehicle 10 in a conventional manner.

A throttle button, not shown, is mounted on a control lever, described hereafter, in the cockpit or occupant area 36. The throttle button is connected by a cable to the motor 110 to provide throttle control to the motor 110 to control the speed of rotation of the first rotary shaft 120. This controls the rate of rotation of the fan 126 to generate an air stream rearward of the vehicle 10. A portion of the air stream generated by the fan 126 flows through the aperture 62 in the upper hull 30 and into the plenum chamber 40 to inflate the inflatable members 12 and to provide lift for the vehicle 10 to raise the vehicle 10 above an underlying ground or water surface. The remaining portion of the air flow generated by the fan 126 exits rearward of the vehicle 10 to provide forward thrust for the vehicle 10.

Figure 9:
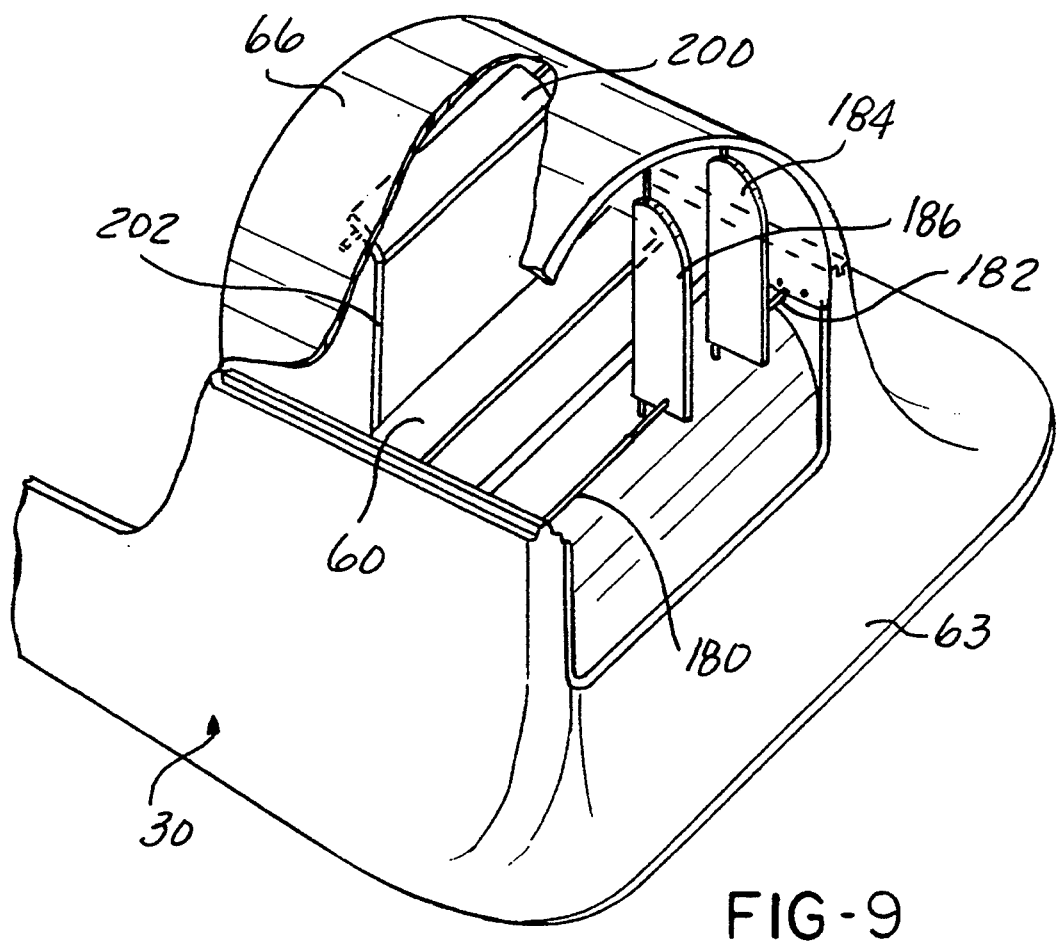
FIG. 9 is a partial, enlarged, perspective view showing the rudders and elevator trim wing employed on the air cushion vehicle shown in FIG. 1.

A steering means is provided to control the direction of movement of the air cushion vehicle 10. Generally, the steering means comprises a control lever 150 which is mounted in the occupant area or cockpit 36, as shown in FIG. 3, a linkage 151, shown in FIGS. 8A–8F and cables 180 and 182 which connect the linkage 151 to a plurality of pivotally mounted plates or rudders 184 and 186 mounted rearward of the fan 126, as shown in FIG. 9.

As shown in FIGS. 8A–8F, the control lever or joystick 150 is fixedly mounted between a pair of plates 152 which are attached to a rotatable shaft 154 rotatably supported in spaced bearings 156 mounted on a support plate 158. A threaded rod 160 is connected to the control lever 150 by a ball and socket joint 153 mounted on a crank arm 155 connected to and rotatable with the shaft 154.

The elements forming the steering linkage 151 of the present invention include the first rod 160 connected to the crank arm 155 and to one end of a first arm 164 which is pivotally connected to the support plate 158. A second threaded rod 166 is connected to a second end of the first arm 164 at one end and, at another end, to one end of a generally L-shaped member 168. The L-shaped member 168 is also pivotally mounted to the support plate 158 by a pivot pin 170. The pivot pin 170 also pivotally and independently supports a V-shaped arm 172 having two spaced legs. The third threaded rod 162 is connected to a ball and socket joint 163 mounted on the lower end of the control lever 150 and extends between the control lever 150 and one of the legs of the V-shaped arm 172. A fourth threaded rod 174 is connected between the other leg of the V-shaped arm 172 and a central leg of a T-shaped arm 176. The T-arm 176 is pivotally mounted at one end of the L-shaped arm 168. A pair of Morse type cables 180 and 182 are connected to opposite ends of the perpendicular leg of the T-arm 176 and extend from the linkage 151 through the interior of the vehicle 10 to the planar plates or rudders 184 and 186, respectively.

Figure 8A:
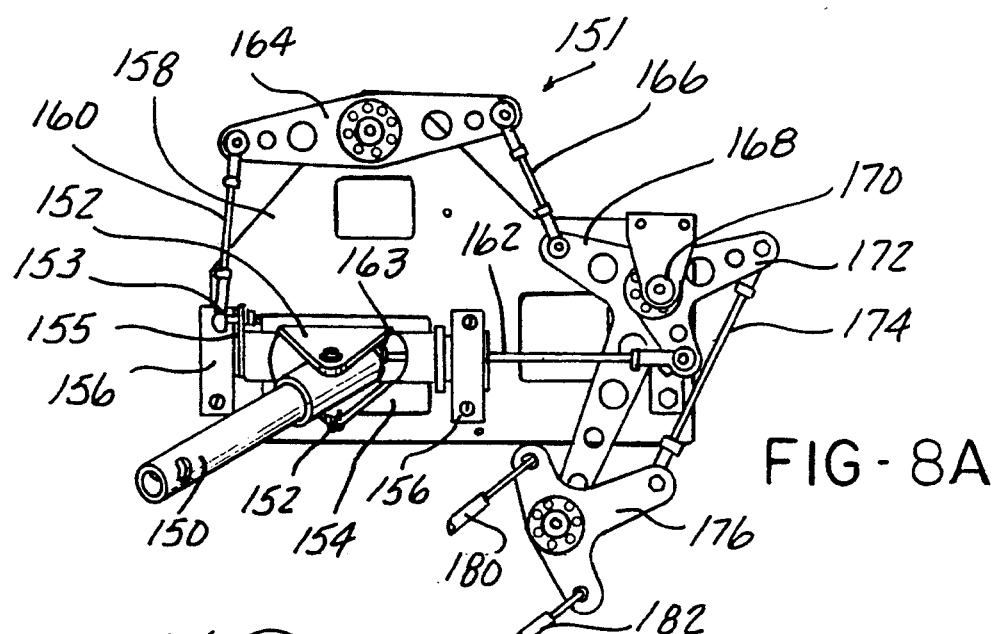
FIGS. 8A-8F are plan views showing the positions of the control lever and linkage during various directional movements of the air cushion vehicle shown in FIG. 1.

In operation, the control lever 150 and the linkage 151 may be used to provide forward, rearward, left and right directional movements to the vehicle 10 and any combination thereof. FIG. 8A depicts a left turn position in which the joystick 150 is pivoted to the left while remaining in a substantially vertical plane extending centrally through the bearings 156. This leftward movement of the control lever 150 drives the rod 162 to the right which pivots the arm 172 and, via the interconnecting rod 174, the arm 176 to the position shown in FIG. 8A. The end result of this leftward movement of the control lever 150 is a pivoting of the T-arm 176 which exerts a push force on cable 180 and a pull force on cable 182. The cables 180 and 182, which may be Morse cables, extend from the T-arm 176 to one of the planar plates or rudders 184 and 186, respectively. This position of the T-arm 176 causes the plate or rudder 184 to be pushed to the left in the orientation shown in FIG 9. Similarly, the cable 182 pulls the other plate or rudder 186 in the same direction or to the left to enable the vehicle 10 to execute a left turn.

Figure 8B:
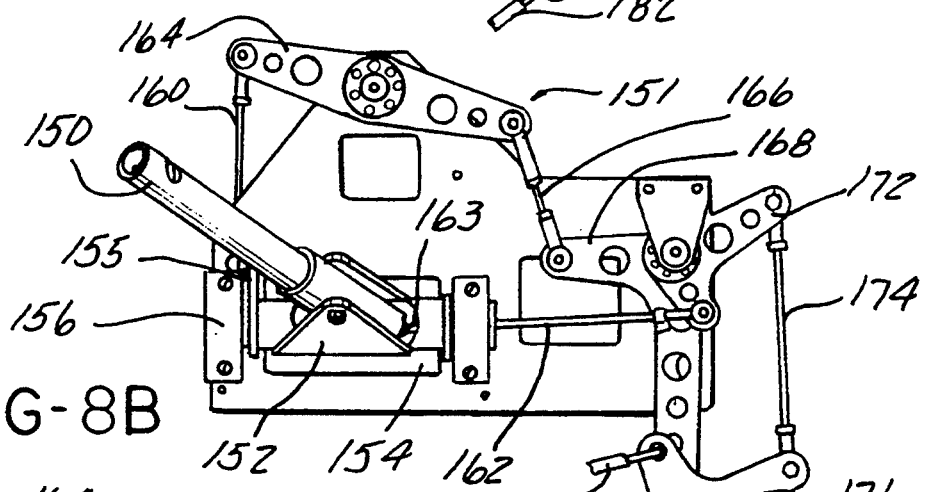

FIG. 8B depicts the position of the control lever 150 and the linkage 151 when a full left turn of the vehicle 10 in conjunction with forward movement of the vehicle is executed. In this position, the control lever 150 is pivoted to the left between the bearings 156 while being urged forward toward the front of the vehicle 10. In this position, the crank arm 155 pivots with forward rotation of the control lever 150 and the shaft 154 to extend the rod 160. This pivots the arm 164 as shown and, through the rods 166 and 174 and the arm 168, shifts the T-arm 176 to the right while leaving the T-arm 176 in its left turn inducing position, as described above. Thus, during any forward motion of the vehicle 10, a full or partial left turn can be executed.

Figure 8C:
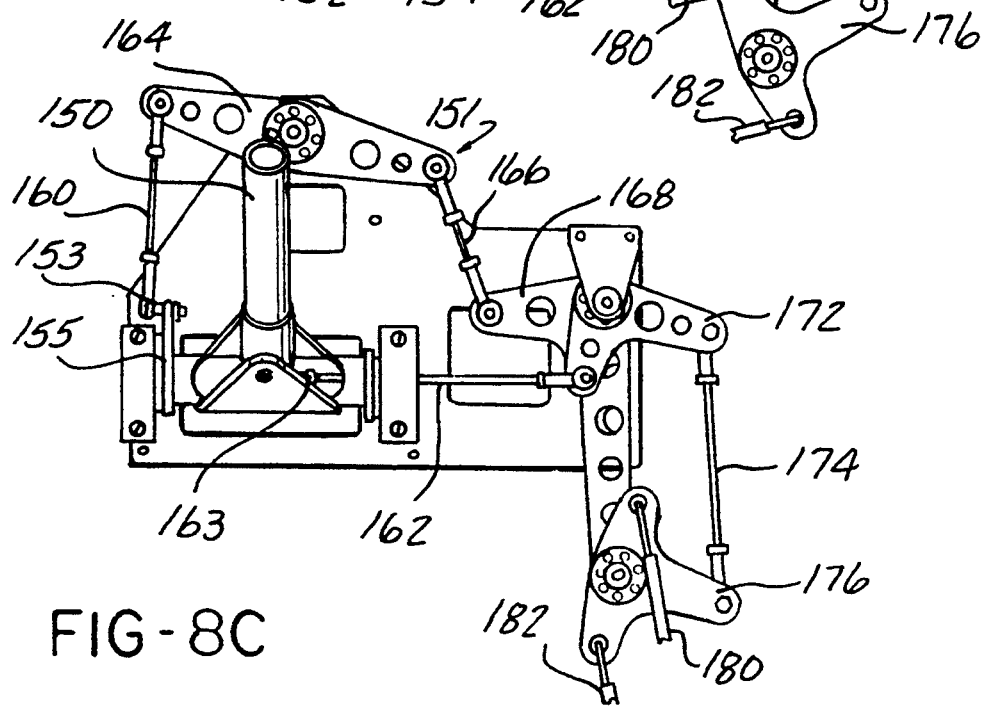

FIG. 8C depicts a full forward position of the control lever 150 with no left or right turn. In this position, the T-arm 176 and the cables 180 and 182 position the plates or rudders 184 and 186 in a generally parallel position with respect to the longitudinal center line of the vehicle 10 to permit full forward directional movement of the vehicle 10 in a straight path.

Figure 8D:
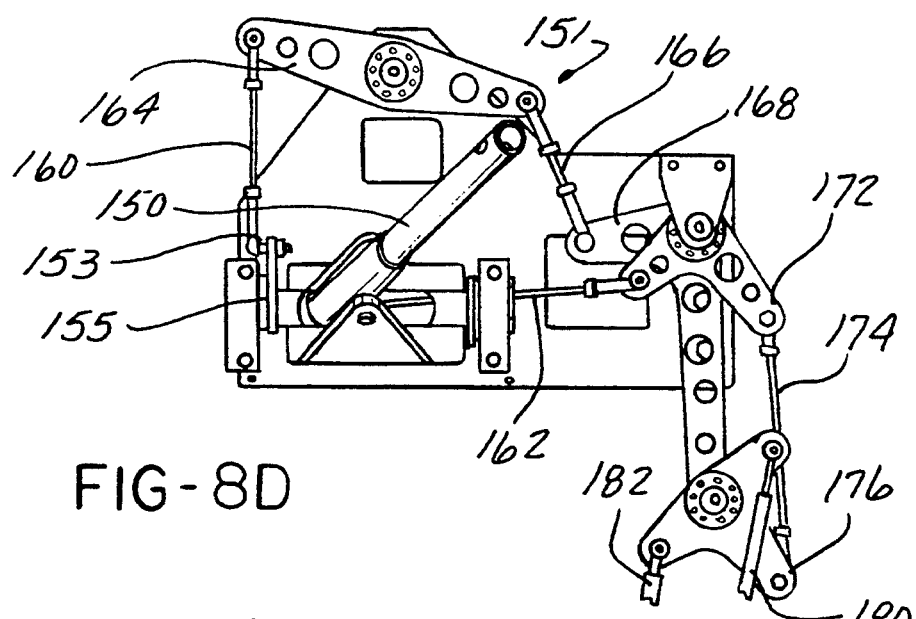
Figure 8E:
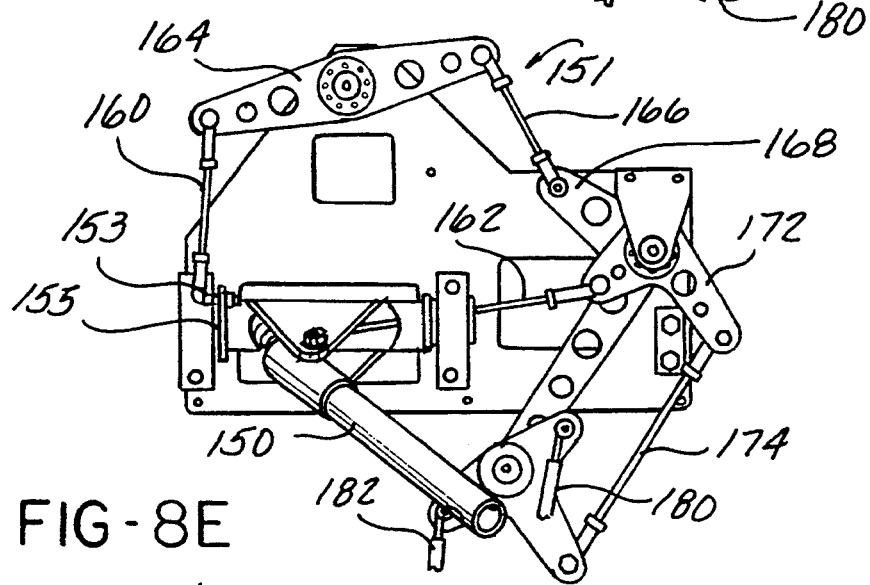
Figure 8F:
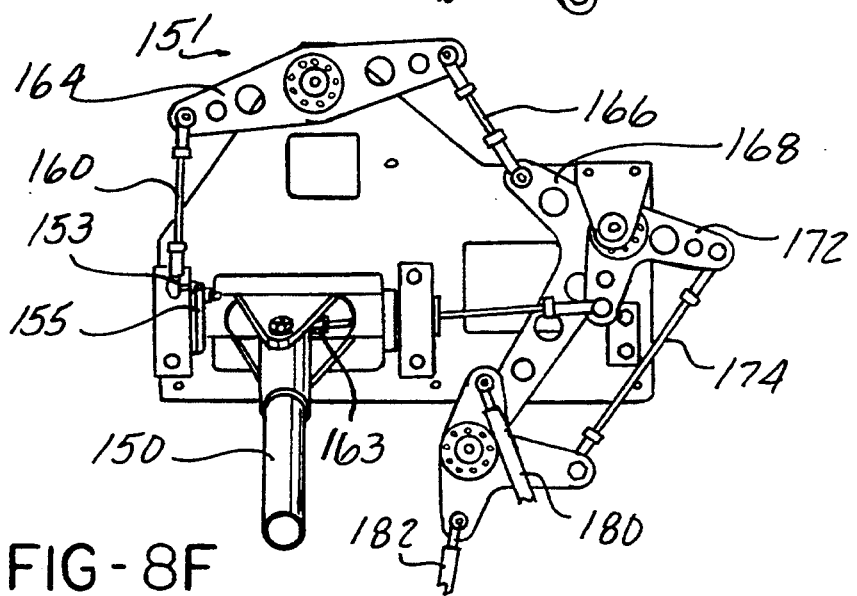

FIG. 8D depicts the position of the control lever 150 and the linkage 151 in executing a full right turn at full forward thrust. FIG. 8E depicts only a right turn position of the control lever 150 and the linkage 151. Finally, FIG. 8F depicts a reverse position of the control lever 150. In this position, the cables 180 and 182 are shifted by the pivoting movement of the T-arm 176 to rotate the plates 184 and 186 to a near perpendicular position with respect to the longitudinal axis of the fan 126 blocking most of the air flow through the plates 184 and 186 and directs such air in a forward direction.

Additional plates, not shown, may be provided adjacent to each plate 184 and 186 and connected thereto by links to form pairs of rudders to increase the surface area of the steering means for greater directional control.

Further control for the vehicle 10 is also provided by an elevator trim wing 200 shown in FIG. 9. The wing 200 has a generally aerodynamic, air foil shape and is pivotally mounted to an upper portion of the shroud 66 between the fan 126 and the plates or rudders 184 and 186. A control cable 202 is connected to the elevator trim wing 200 and extends through the vehicle 10 to a control lever 204 mounted in the cockpit or occupant area 36. The control lever 204 is movable between two positions including a first position in which the wing 200 is substantially horizontally positioned, as shown in FIG. 9. This position is used for a generally planar or level orientation of the vehicle 10 during forward movement thereof. The lever 204 may be moved to a second position which causes a pivoting of the wing 200 from the horizontal position to a generally angular position with the rear end of the wing 200 moved above the front edge of the wing 200 to lower the nose or bow of the vehicle 10 during liftoff.

The vehicle 10 is also provided with roll control means for controlling the roll action of the vehicle 10 along its longitudinal centerline during left and right turns. The roll control means includes a plate 210, shown in FIG. 4, which is fixedly mounted in the plenum chamber 40, at the front end of the vehicle 10, preferably along the longitudinal center line of the vehicle 10. The plate 10 closes the plenum chamber 40 at the front portion thereof. A pair of diverter gates 212 and 214 are also pivotally mounted in the plenum chamber 40, preferably adjacent the rear end of the vehicle 40 on opposite sides of the longitudinal centerline of the vehicle 10. As shown in FIG. 5, the diverter gate 214 is pivotally mounted by means of a pivot rod 216 to the upper hull 30 and extends downward into the plenum chamber 40. The diverter gate 214, as well as the identically formed diverter gate 212, is provided in a predetermined size so as to block a substantial portion, such as 60%, of the air flow through one side of the plenum chamber 40, when oriented perpendicular to the direction of air flow through the plenum chamber 40, as shown in the position depicted in FIG. 5. Each diverter gate 212 and 214 is connected by a control cable 218 to the T-arm 176 of the steering linkage 151 and moves in conjunction with full forward and left and right turn movements of the control lever 150 between a first position shown in solid in FIG. 5 blocking a substantial portion of the air flow through one side of the plenum chamber 40 and any angular position therefrom up to a generally horizontal position allowing complete air flow through one side of the plenum chamber 40. Since the diverter gates 212 and 214 are located adjacent the rear end of the vehicle, in proximity with the aperture 62 in the hull 40, and since the diverter gates 212 and 214 act in opposition, such that one diverter gate 214 will be in the air blocking position shown in FIG. 5 while the other diverter gate 212 will be in the complete air flow position during a left or right turn, during a left turn, for example, the diverter gate 214 will be oriented in the air blocking position shown in FIG. 5 thereby blocking substantially 60% of the air flow to the left side of the plenum chamber 40. This decreases the lift on the left side of the vehicle 10. At the same time, a larger quantity of air flow passes to the right side of the plenum chamber 40 increasing the lift through the inflatable members 12 thereon and raising the right side of the vehicle. This controls the roll motion of the vehicle 10 during a left turn. A similar, opposite action occurs during a right turn. During straight, full forward motion, both diverter gates 212 and 214 are in the open, air flow position.

In summary, there has been disclosed a unique air cushion vehicle having improved steering, roll control and propulsion systems.

What is claimed is:

1. An air cushion vehicle comprising:
    a hull formed of a lower hull fixedly joined to an upper hull, the lower hull having a substantially planar bottom surface and a peripheral flange surface extending upward at a predetermined angle from the bottom surface, the upper hull having an upper surface extending from an edge of a peripheral flange surface to a substantially vertical wall surrounding and forming a recessed occupant area formed within the upper surface, the upper hull further including a top deck portion having an arcuate shaped exterior surface and a central aperture alignable with the recessed occupant area in the upper hull, a pair of spaced walls extending upward from the peripheral flange of the top deck portion rearward of the central aperture therein;
    canopy means, attachable to the walls on the top deck portion, for covering the recessed occupant area in the hull, the canopy means including:
        a frame supporting a windshield; and
        hinge means pivotally mounting the frame to the upstanding walls on the top deck portion for pivotal movement of the frame between a first positoin covering the occupant area and a second position in which a portion of the canopy means is spaced from the occupant area;
    an air flow plenum chamber formed interiorly within and between the lower hull and the upper hull in fluid flow communication with a plurality of apertures formed in the peripheral flange surface of the lower hull;
    a plurality of inflatable members attached to the peripheral flange surface of the lower hull, each inflatable member having a first aperture disposed in fluid flow communication with one of the apertures in the peripheral flange surface of the lower hull and a second aperture opening exteriorly of the inflatable member below the bottom surface of the lower hull;
    fluid propulsion means mounted on the upper hull for generating a vehicle propelling fluid flow rearward of the vehicle and for generating a fluid flow into the plenum chamber for inflating the inflatable members to lift the vehicle above an underlying surface;
    motive power means, connected to the fluid propulsion means, for driving the fluid propulsion means; and
    operator actuated steering means for controlling the direction of fluid flow from the fluid propulsion means, the steering means including:
        a pivotal control lever mounted in the occupant area; and
        linkage means, responsive to the position of the control lever, for controlling the position of a plurality of pivotal plates mounted on the upper hull rearward of the fluid propulsion means.

2. The air cushion vehicle of claim 1 further comprising:
    latch means, mounted on the top deck portion and the frame, for releasably latching the frame, when in the first position, to the top deck portion.

3. The air cushion vehicle of claim 2 further comprising:
    latch release means, coupled to the latch means and mounted interiorly within the occupant area of the hull, for releasing the latch means to permit pivotal movement of the frame.

4. The air cushion vehicle of claim 1 wherein the canopy means further comprises:
    a roof panel removably mounted on a top portion of the frame.

5. The air cushion vehicle of claim 4 further comprising:
    roof panel latch means, mounted on the frame and the roof panel, for releasably latching the roof panel to the frame.

6. An air cushion vehicle comprising:
    a hull formed of a lower hull fixedly joined to an upper hull, the lower hull having a substantially planar bottom surface and a peripheral flange surface extending upward at a predetermined angle from the bottom surface, the upper hull having an upper surface extending from an edge of a peripheral flange surface to a substantially vertical wall surrounding and forming a recessed occupant area formed within the upper surface;
    an air flow plenum chamber formed interiorly within and between the lower hull and the upper hull in fluid flow communication with a plurality of apertures formed in the peripheral flange surface of the lower hull;
    a plurality of inflatable members attached to the peripheral flange surface of the lower hull, each inflatable member having a first aperture disposed in fluid flow communication with one of the apertures in the peripheral flange surface of the lower hull and a second aperture opening exteriorly of the inflatable member below the bottom surface of the lower hull;
    fluid propulsion means mounted on the upper hull for generating a vehicle propelling fluid flow rearward of the vehicle and for generating a fluid flow into the plenum chamber for inflating the inflatable members to lift the vehicle above an underlying surface;
    motive power means, connected to the fluid propulsion means, for driving the fluid propulsion means;
    operator actuated steering means for controlling the direction of fluid flow from the fluid propulsion means, the steering means including:
        a pivotal control lever mounted in the occupant area; and
        linkage means, responsive to the position of the control lever, for controlling the position of a plurality of pivotal plates mounted on the upper hull rearward of the fluid propulsion means; and
    roll control means for controlling the roll movement of the vehicle about a longitudinal axis thereof, the roll control means including:
        a divider plate mounted in the plenum chamber at a front central portion of the hull dividing the plenum chamber into two separate plenum portions;
        first and second diverter plates respectively mounted in one of the separate plenum portions at a second portion of the hull, each of the first and second diverter plates being pivotally mounted for variable angular movement between a first position substantially perpendicular to an air flow path through one of the plenum portions to block a predetermined portion of air flow to one of the plenum portions and a variably selectable angular position allowing a predetermined amount of air flow through one of the plenum portions; and control means, connected to the control lever, for oppositely and separately pivoting the first and second diverter plates in response to a left and right turn movement, respectively, of the control lever.

* * * * *